United States Patent [19]
Izumita et al.

[11] 4,293,944
[45] Oct. 6, 1981

[54] INFORMATION PLAY-BACK APPARATUS WITH ASTIGMATIC AUTO-FOCUSING

[75] Inventors: Morishi Izumita, Hachioji; Takeshi Maeda, Kokubunji, both of Japan; Yoshito Tsunoda, Stanford, Conn.; Susumu Sawano, Tachikawa, Japan

[73] Assignee: Hitachi, Ltd., Tokyo, Japan

[21] Appl. No.: 810,166

[22] Filed: Jun. 27, 1977

[30] Foreign Application Priority Data

Jun. 25, 1976 [JP] Japan .................................. 51-74353
Aug. 9, 1976 [JP] Japan .................................. 51-94000

[51] Int. Cl.³ .......................... G11B 7/12; G11B 17/00
[52] U.S. Cl. ...................................... 369/45; 369/46; 369/109; 369/112
[58] Field of Search ...................... 358/128, 127, 128.5, 358/128.6; 179/100.3 V, 100.1 G; 350/190; 250/201, 202, 203, 204, 570; 340/173 LT, 173 LM; 365/215, 124, 127, 120

[56] References Cited

U.S. PATENT DOCUMENTS

| | | | |
|---|---|---|---|
| 3,962,721 | 6/1976 | Haan | 179/100.3 V |
| 4,001,494 | 1/1977 | Adler | 358/127 |
| 4,011,400 | 3/1977 | Simons | 358/127 |
| 4,025,949 | 5/1977 | Whitman | 179/100.3 V |
| 4,037,929 | 7/1977 | Bricot | 179/100.3 V |

*Primary Examiner*—Raymond F. Cardillo
*Attorney, Agent, or Firm*—Craig and Antonelli

[57] ABSTRACT

Information play-back apparatus comprising a laser source, a recording medium, a photodetector, a first optical system which conducts a laser beam from the laser source to an information track on the recording medium as a read spot, and a second optical system which conducts a reflected laser beam from the information track to the photodetector through an optical element having the unidirectional lens action, said optical element being arranged in a manner to define an angle of about 45 degrees relative to the direction of the information track, and said photodetector having at least four light receiving portions divided symmetrically about two axes such that at least one light receiving portion is in each of the four quadrants formed by two axes, and one of the axes is parallel to the direction of the information track.

11 Claims, 17 Drawing Figures

FIG. 5
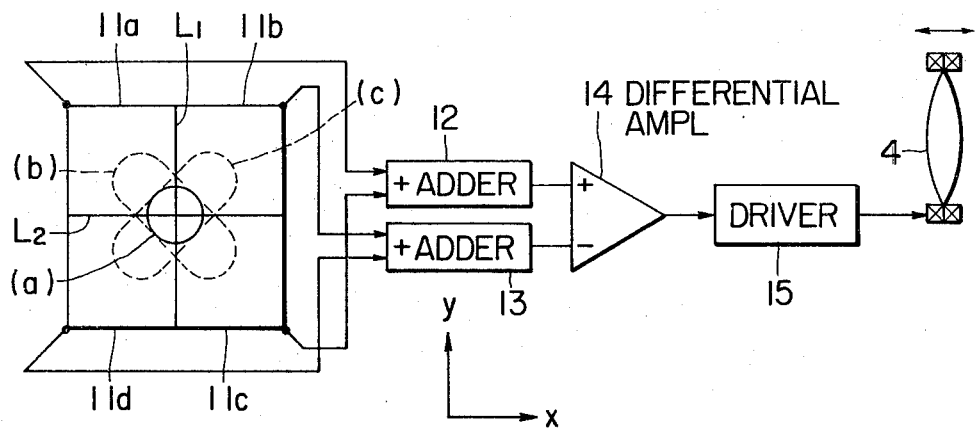
FIG. 6A
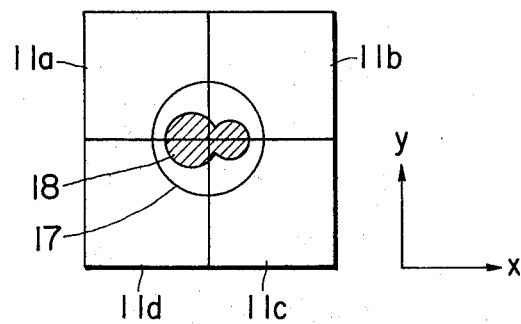
FIG. 6E  FIG. 6F  FIG. 6G
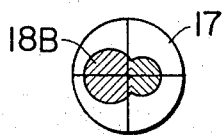 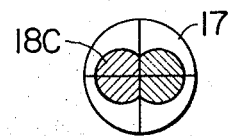 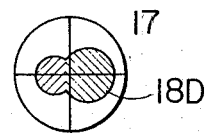
FIG. 6B  FIG. 6C  FIG. 6D
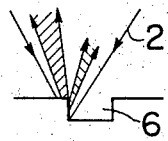 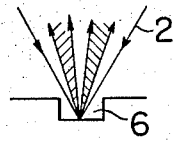 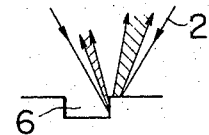

INFORMATION PLAY-BACK APPARATUS WITH ASTIGMATIC AUTO-FOCUSING

BACKGROUND OF THE INVENTION

1. Field of the Invention

This invention relates to optical information play-back apparatus, and more particularly to apparatus for playing back information recorded on an optical video disk.

2. Description of the Prior Art

In general, information play-back apparatus, for example, video disk play-back apparatus requires in order to optically and accurately play back information recorded on a video disk, auto-focusing means for focusing a laser beam so that it may always converge on the video disk, and tracking means for controlling the position of the converging point of the laser beam so that the laser beam may always track a predetermined information track on the disk.

Hereunder, problems in prior arts will be described on the auto-focusing and then on the tracking.

As a typical auto-focusing method having heretofore been employed, there is one in which using a light beam for detecting a focal position besides a light beam for detecting information, the variation of a disk on the optical axis is detected, and the converging point of the light beam for playing back information is brought onto the disk automatically with the detected signal. Since, however, the prior-art auto-focusing method requires two optical systems, it involves a complicated structure.

When, in the above method requiring the two light beams, a single light source therefor is used, a laser source of high power is necessary. When two light sources are employed, the apparatus becomes expensive.

In order to eliminate the drawbacks, apparatus as shown in FIG. 1 has been proposed. This apparatus executes the auto-focusing by the use of an astigmatic optical system. That is, using an optical element having the unidirectional lens action (for example, a cylindrical lens), defocusing is detected in the form of a change in the optical density distribution of a reflected laser beam.

Referring to FIG. 1, a laser beam 2 emergent from a laser source (for example, He-Ne laser or semiconductor laser) 1 passes through a beam splitter 3 and a converging lens 4 and is converged on an information track 6 of a video disk 5. A reflected laser beam containing information of the information track 6 passes through the converging lens 4, is reflected by the beam splitter 3 and is converged only in one direction by a cylindrical lens 7. Thus, it is converted into a non-point convergent beam.

Accordingly, the contour of the reflected laser beam becomes elongate in an X-direction at a point 8 (a point on which the reflected laser beam is focused by the converging lens 4 and the cylindrical lens 7), and it becomes elongate in a y-direction at a point 9 (the focus of the converging lens 4). At an intermediate point 10 (a point which lies substantially at the middle between the points 8 and 9), the reflected laser beam exhibits a circular contour which extends substantially equally in the x- and y-directions. If the video disk 5 shifts in a direction in which it comes close to the converging lens 4, the contour of the reflected laser beam at the point 10 becomes elongate in the x-direction. Conversely, if the video disk 5 shifts in a direction in which it goes away from the converging lens 4, the contour of the reflected laser beam at the point 10 becomes elongate in the y-direction.

FIG. 2 is a schematic block diagram in the case where a photodetector 11 having four photocells 11a–11d is arranged at the position of the point 10 indicated in FIG. 1. Signals of two ones 11a and 11c of the four photocells of the photodetector 11 are added by an adder 12, while signals of the other two photocells 11b and 11d are added by an adder 13. Outputs from the two adders 12 and 13 are applied to a differential amplifier 14. Further, an output from the differential amplifier 14 is applied to a driver 15 for the converging lens 4. The driver 15 serves to move the converging lens 4 in the direction in which it comes close to or goes away from the video disk 5, in response to the output of the differential amplifier 14. More specifically, in case where the illumination beam is exactly focused on the video disk 5, the contour of the reflected laser beam on the photodetector 11 becomes a circular pattern which extends equally in the x- and y-directions as indicated by a solid line (a), and the light intensity is not maldistributed, so that the output of the differential amplifier 14 becomes zero. Therefore, the converging lens 4 is not moved. If the video disk 5 shifts in the direction in which it comes close to the converging lens 4, the contour of the reflected laser beam becomes elongate in the x-direction as indicated by a dotted line (b). In consequence, the output of the differential amplifier 14 becomes negative, and the converging lens 4 is moved in the direction of going away from the video disk 5. Conversely, if the video disk 5 goes away from the converging lens 4, the contour becomes elongate in the y-direction as indicated by a dotted line (c). In consequence, the output of the differential amplifier 14 becomes positive, and the converging lens 4 is moved in the direction of coming close to the video disk 5.

The auto-focusing of the proposed system, however, has the disadvantage that an unbalance in the light intensity distribution of the reflected laser beam arises under the influence of a pit in the information track and that the unbalance degrades the precision of the auto-focusing. That is, even in the case of the circular contour which extends equally in the x- and y-directions as indicated by the solid line (a), the output of the differential amplifier 14 does not become zero. Accordingly, notwithstanding that the illumination laser beam is in focus, the converging lens 4 is moved relative to the disk 5. The unbalance of the light intensity distribution will now be explained.

Information is written in the video disk 5 in the form of a pit which is 1 $\mu$m wide, 2–3 $\mu$m long and 0.15 $\mu$m deep. Regarding the depth, a value of $\frac{1}{4}$ of the wavelength of the play-back laser light is the optimum. It is ideal to make the depth of the pit exactly the quarter wavelength and to make the edge of the pit exactly 90° with respect to the disk surface (to make the edge of the pit sharp). In the manufacture of the disk, however, it is difficult to form the pits at such high precision. When a spot of the laser beam illuminates the pit under the state under which the depth of the pit deviates from $\frac{1}{4}$ of the wavelength of the play-back laser light and under which the spot is eccentric to the pit, the light intensity distribution on the photocells 11a–11d is unbalanced in the x-direction as in a spot 18 shown by way of example in FIG. 3.

When, even if the depth of the pit is the $\frac{1}{4}$ wavelength, the laser beam does not impinge on the center of the pit, diffracted light ascribable to obtuseness of the edge (stepped part) of the pit gives rise to an unbalance in the light intensity distribution in the x-direction likewise to the case of the spot 18 shown by way of example in FIG. 3.

That is, a spot 17 of the reflected laser beam on the photodetector 11 having the photocells 11a–11d contains the diffracted light spot 18 which is maldistributed in the x-direction and which is attributed to the pit. Accordingly, the light distribution on the photodetector 11 is intenser in the x-direction than in the y-direction.

Although such phenomenon can occur in both the x- and y- directions, the unbalance in the light intensity distribution in the y-direction is not a serious problem. More specifically, in the video disk, information are successively read out in the direction of the track (in case of a circular track, in the tangential direction thereof). Therefore, supposing the direction of the track to be the y-direction, even when the diffracted beam becomes unbalanced in the y-direction at a certain time, the unbalance in the course in which the beam spot moves towards the central part of the pit and the unbalance in the course in which the beam spot departs therefrom appear in senses opposite to each other. Accordingly, the unbalances in the y-direction are averaged, and they hardly affect the automatic adjustment of focusing. In contrast, the unbalances in the x-direction appear in the same direction both when the beam spot comes close to the central part of the pit and when the beam spot goes away therefrom, so that they have an bad effect on the automatic adjustment of focusing.

That is, notwithstanding that the lens is in focus, the unbalances in the x-direction generate the output of the differential amplifier 14 and move the lens in a fixed sense.

On the other hand, as to the tracking, there have heretofore been several methods. For example, there has been apparatus in which two laser beams exclusively for the tracking are jointly used, or apparatus in which a laser beam is minutely vibrated on a track. Both the apparatuses, however, are disadvantageous in that a laser beam is required anew or that an element for the minute vibrations is required, so that the apparatus itself becomes complicated and large-scaled, which in turn makes the apparatus expensive.

SUMMARY OF THE INVENTION

An object of this invention is to provide information play-back apparatus capable of executing the auto-focusing reliably.

Another object of this invention is to provide information play-back apparatus capable of performing the tracking precisely.

In order to accomplish such objects, this invention arranges a cylindrical lens and a photodetector in a manner to incline about 45 degrees relative to the direction of an information track. Thus, the bad effect on the auto-focusing by the distribution of diffracted light from the track as contained in a reflected laser beam is eliminated, and the tracking is precisely carried out by detecting an information of a track deviation as contained in the reflected laser beam.

BRIEF DESCRIPTION OF THE DRAWINGS

FIG. 5 is a view which shows the construction of an embodiment of auto-focusing in this invention, FIG. 6A is a diagram of the distribution of a laser beam on a photodetector in the case where the depth of a pit has changed, FIGS. 6B–6G are diagrams which show the distributions of a laser beam dependent on the relative positions between a beam spot and a track.

DESCRIPTION OF THE PREFERRED EMBODIMENTS

Figure 1:
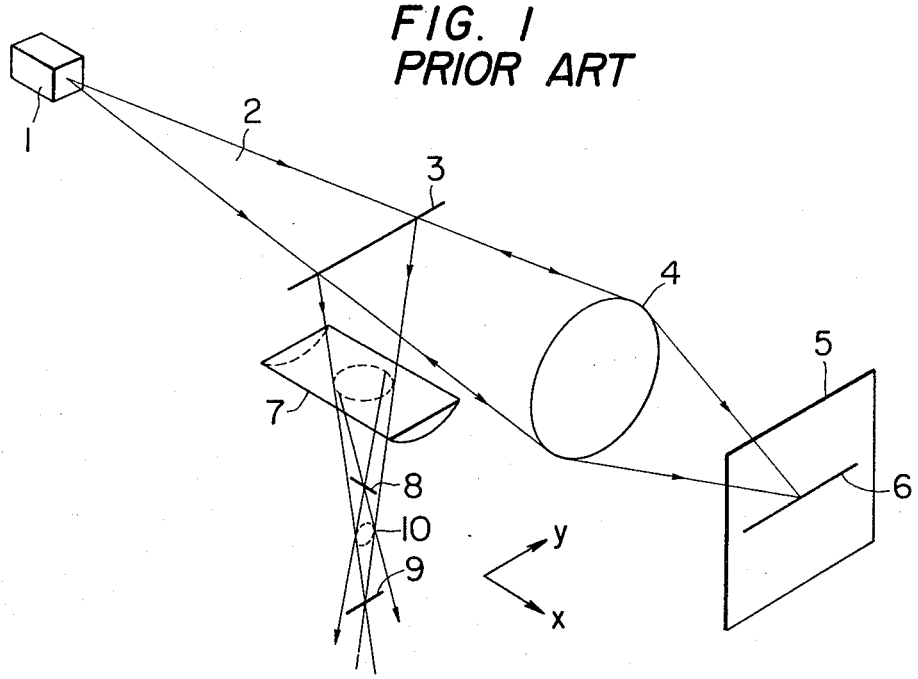
FIG. 1 is a constructional view of an auto-focusing optical system of prior-art information play-back apparatus.
Figure 4:
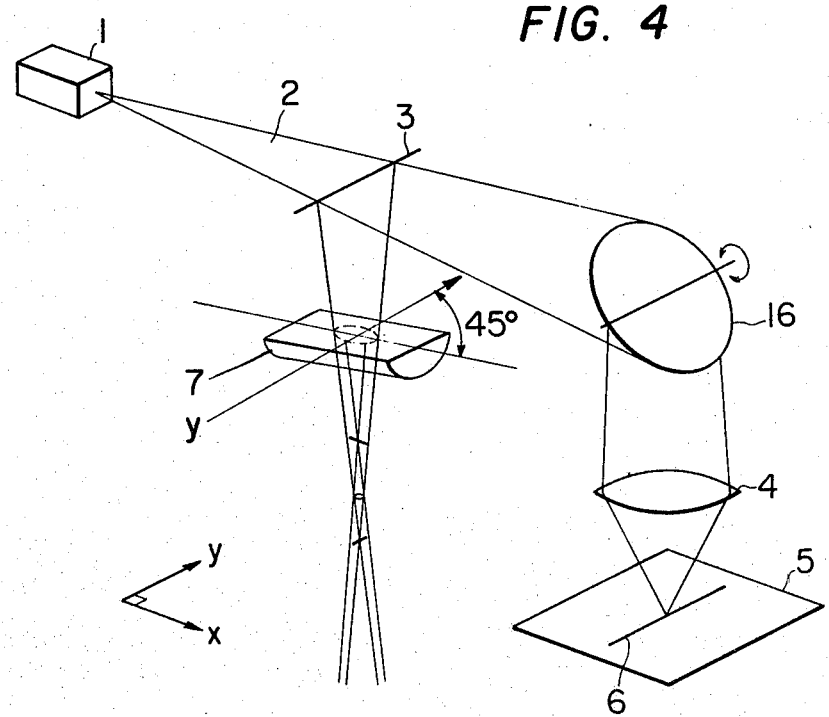
FIG. 4 is a constructional view which shows an embodiment of an optical system in information play-back apparatus of this invention.

FIG. 4 is a view which shows the construction of an embodiment of an optical system for use in this invention. In the figure, the same symbols as in FIG. 1 designate the same or equivalent constituents. Numeral 16 designates an optical scanner (a driver therefor is omitted from the illustration). Of course, the optical scanner 16 is required as to the tracking, and it is not directly pertinent to the auto-focusing.

Figure 2:
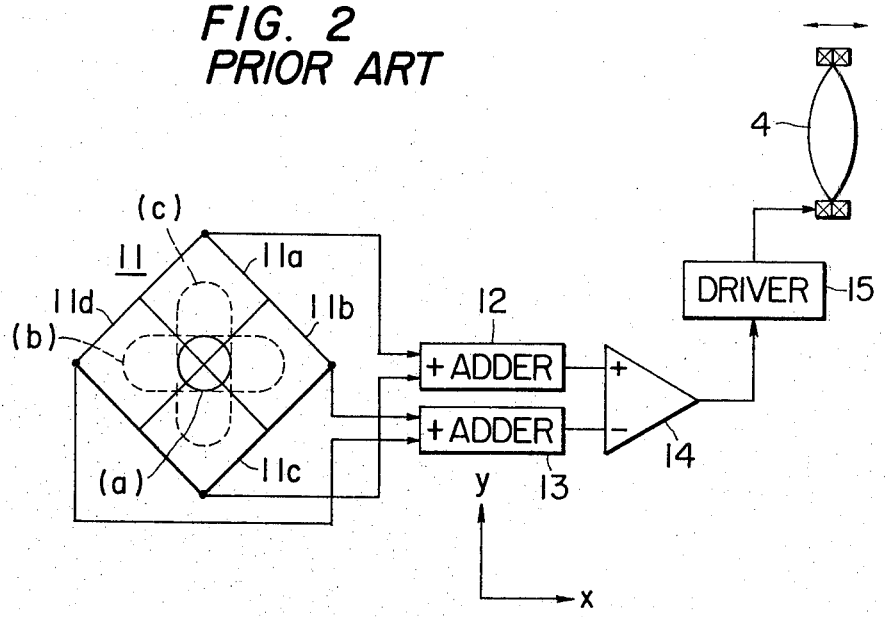
FIG. 2 is a view which illustrates auto-focusing in the prior art.
Figure 3:
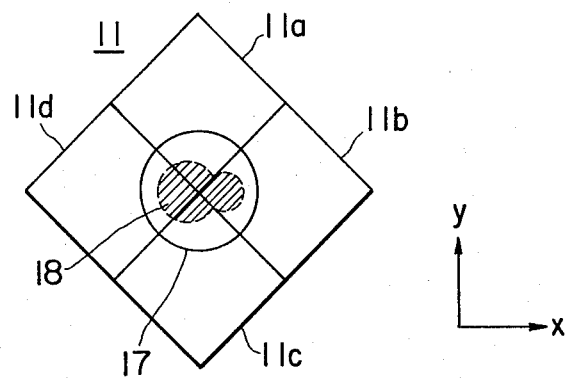
FIG. 3 is a diagram which represents the distribution of a laser beam on a photodetector in the case where the depth of a pit has changed.

The laser beam emergent from the laser source 1 passes through the beam splitter 3, the optical scanner 16 and the converging lens 4 and is converged on the information track 6 of the video disk 5. The reflected laser beam from the information track 6 passes through the converging lens 4 and the optical scanner 16 and is guided towards the cylindrical lens 7 by the beam splitter 3. The cylindrical lens 7 is arranged in such a manner that its optical axis inclines about 45 degrees with respect to the direction of the track, i.e., the y-direction in FIG. 4. Simultaneously therewith, the photodetector 11 is arranged in a manner that, as shown in FIG. 5, either of boundary lines $L_1$ and $L_2$ of the photocells is parallel to the y-direction. That is, it is arranged in a manner to incline 45° relative to the photodetector in FIG. 2. The symbols of various parts in FIG. 5 correspond to those in FIG. 2. When, in case of such arrangements of the cylindrical lens 7 and the photodetector 11, the depth of the pit deviates from $\frac{1}{4}$ of the wavelength of the play-back laser beam, the distribution of the reflected laser beam becomes as shown in FIG. 6A. Here, numeral 17 denotes the contour of the reflected laser beam from the disk 5, and numeral 18 the contour of the diffracted beam by the information track 6 as superposed on the reflected beam contour. As apparent from the figure, the diffracted beam patterns are equal on the photocells 11a and 11b and on the photocells 11d and 11c. Accordingly, a signal obtained by adding the outputs of the light receiving portions 11a and 11c of the photodetector 11 by means of the adder 12 as shown in FIG. 5 and a signal obtained by adding the outputs of the light receiving portions 11b and 11d by means of the adder 13 become substantially equal magnitudes. Consequently, the unbalance of the intensities of the diffracted beam patterns in the x-direction is not detected as a signal. The relations between the contours of the reflected laser beam and the position of the photodetector 11 become as shown by dotted lines in FIG. 5 since the cylindrical lens 7 is arranged slanting about 45 degrees relative to the y-direction. Needless to say, therefore, the auto-focusing can be done likewise to the case of FIG. 2.

Figure 7:
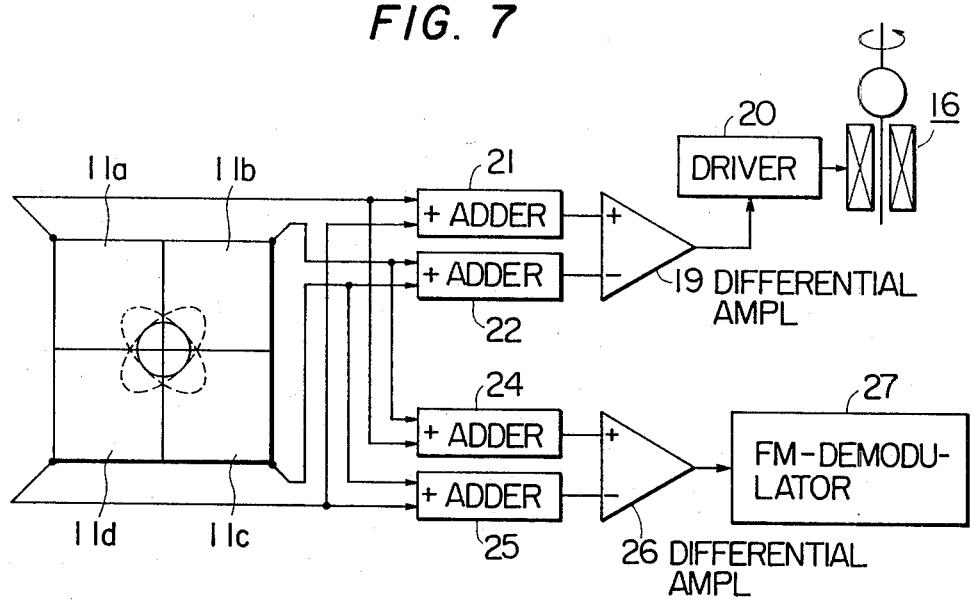
FIG. 7 is a view which shows the construction of an embodiment of tracking in this invention.

FIG. 7 is a block diagram of an embodiment of this invention for executing the tracking by the use of the optical system shown in FIG. 4. This embodiment exploits the changes of the diffracted beam contour 18 of the reflected laser beam 17 as are based on the changes of the positions of the pit 6 and the spot of the laser beam 2 focused on the video disk. In correspondence with the positional relations between the beam spot and the pit as shown in FIGS. 6B, 6C and 6D, the contour of the diffracted beam 18 appearing in the contour of the reflected laser beam 17 changes as shown in FIGS. 6E, 6F and 6G respectively. FIG. 6B illustrates a case where the laser beam 2 is projected as a spot onto the left side of the pit 6, and the reflected laser beam becomes as indicated by oblique lines in the figure. As the result, the contour of the diffracted beam 18 produced in the contour of the reflected laser beam 17 becomes as shown at 18B in FIG. 6E. FIG. 6C illustrates a case where the laser beam 2 is projected appropriately onto the pit 6. In this case, the contour of the diffracted beam 18 becomes as shown at 18C in FIG. 6F. FIG. 6D illustrates a case where the laser beam 2 is projected onto the right side of the pit 6. In this case, the contour of the diffracted beam 18 becomes as shown at 18D in FIG. 6G. In this manner, depending on the difference of the position at which the laser beam 2 illuminates the track 6, i.e., on the deviation of the tracking, the diffracted beam contour of the reflected laser beam changes as those 18B and 18D respectively shown in FIG. 6E and FIG. 6G. Therefore, the change may be detected by the photodetector, and the diffracted beam contour may be put into that 18C shown in FIG. 6F. That is, the laser beam 2 is controlled so that the laser beam 2 and the track 6 may satisfy the positional relation illustrated in FIG. 6C.

A signal indicative of the deviation of the tracking can be obtained by evaluating the first sum between the output signals from the photocells 11a and 11d of the photodetector 11 and the second sum between the output signals from the photocells 11b and 11c and then evaluating the difference between both the sum signals as illustrated in FIG. 7. Here, numeral 21 indicates an adder for evaluating the first sum, numeral 22 an adder for evaluating the second sum, and numeral 19 a differential amplifier for evaluating the difference between the first and second sums. The output from the differential amplifier 19 is applied to an optical scanner driver 20, whose output is used to drive the optical scanner 16.

In FIG. 7, the outputs of the light receiving portions 11a and 11b of the photodetector are applied to an adder 24, the outputs of the light receiving portions 11c and 11d of the photodetector are applied to an adder 25, the outputs of both the adders 24 and 25 have the difference evaluated by a differential amplifier 26, and the difference is demodulated into a video signal by an FM-demodulator 27.

Figure 8:
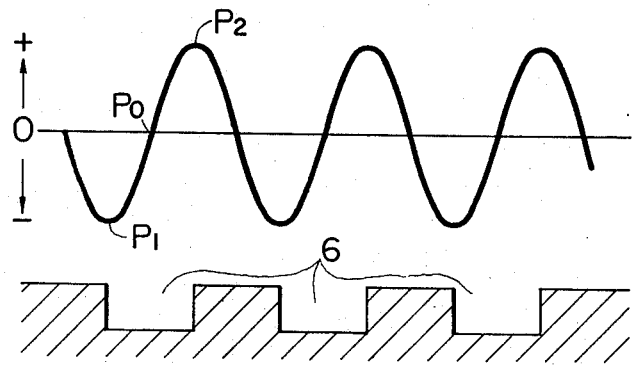
FIG. 8 is a model diagram of a track deviation-detecting signal according to this invention.

FIG. 8 shows the output signal of the differential amplifier 19 as depends on the change of the contour 18 of the beam diffracted by the track 6. It is evident that the influence by the unbalance of the contour of the diffracted beam is nullified. More specifically, in FIG. 8, $P_1$ denotes the output signal of the differential amplifier 19 at the time when the laser beam is projected onto the left side of the pit 6, and $P_2$ the output signal of the differential amplifier 19 at the time when the laser beam is projected onto the right side of the pit. When the laser beam is projected onto the center of the pit 6, the output of the differential amplifier 19 becomes as shown at $P_o$, and evidently the influence by the unbalance is removed.

Figure 9:
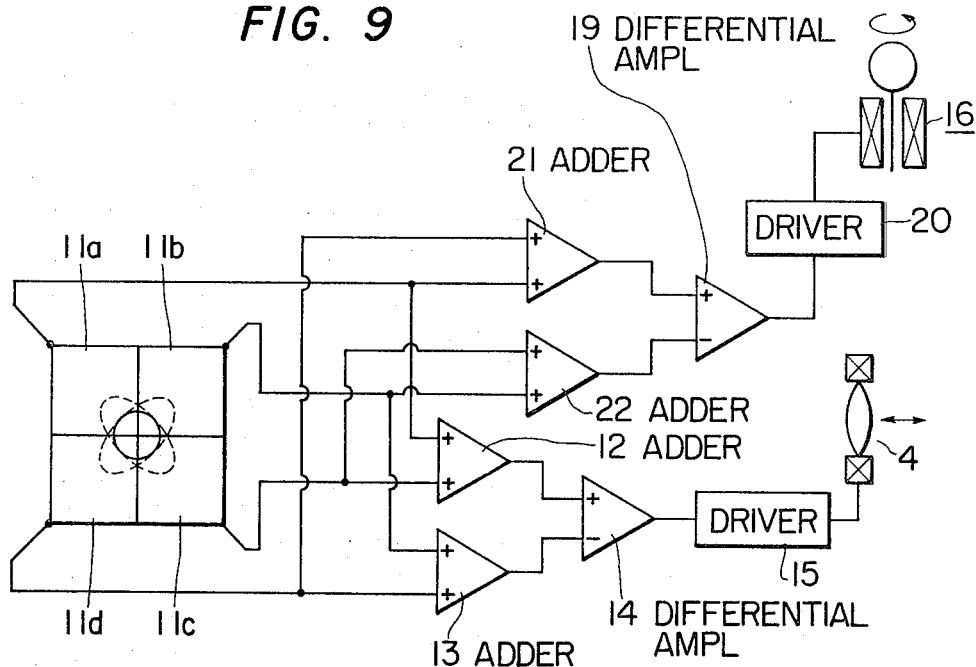
FIG. 9 is a block diagram which shows an embodiment of this invention with the auto-focusing and the tracking combined.

FIG. 9 is a diagram which shows the construction of an embodiment of this invention capable of the auto-focusing and the tracking at the same time. The embodiment has the embodiment of FIG. 5 and that of FIG. 7 combined together. According to such embodiment, the auto-focusing and the tracking become possible by the processing of the output signals of the photodetector. Further, the video signal can be taken out by, for example, evaluating the summation of the output signals of the photodetector portions 11a, 11b, 11c and 11d. A better video signal can be obtained by taking the difference between the signal of the sum of the outputs of the photocells 11a and 11b and the signal of the sum of the outputs of the photocells 11c and 11d as in the embodiment of FIG. 7.

In the tracking, the eccentricity of the disk 5 sometimes affects the execution of a precise tracking. In case where the amount of eccentricity of the disk 5 is as extremely large as, for example, 200 μm peak-peak, the beam spot is moved on the photodetection surface by the tracking, and the movement exerts a bad influence on a tracking signal. Even in such case, a better tracking can be done in accordance with this invention.

Figure 11:
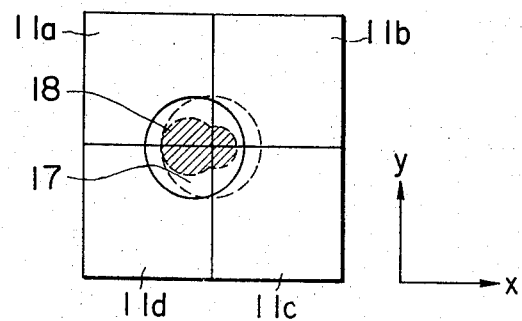
FIG. 11 is a diagram of the distribution of a laser beam on a photodetector in the case where a beam spot has been moved.
Figure 10:
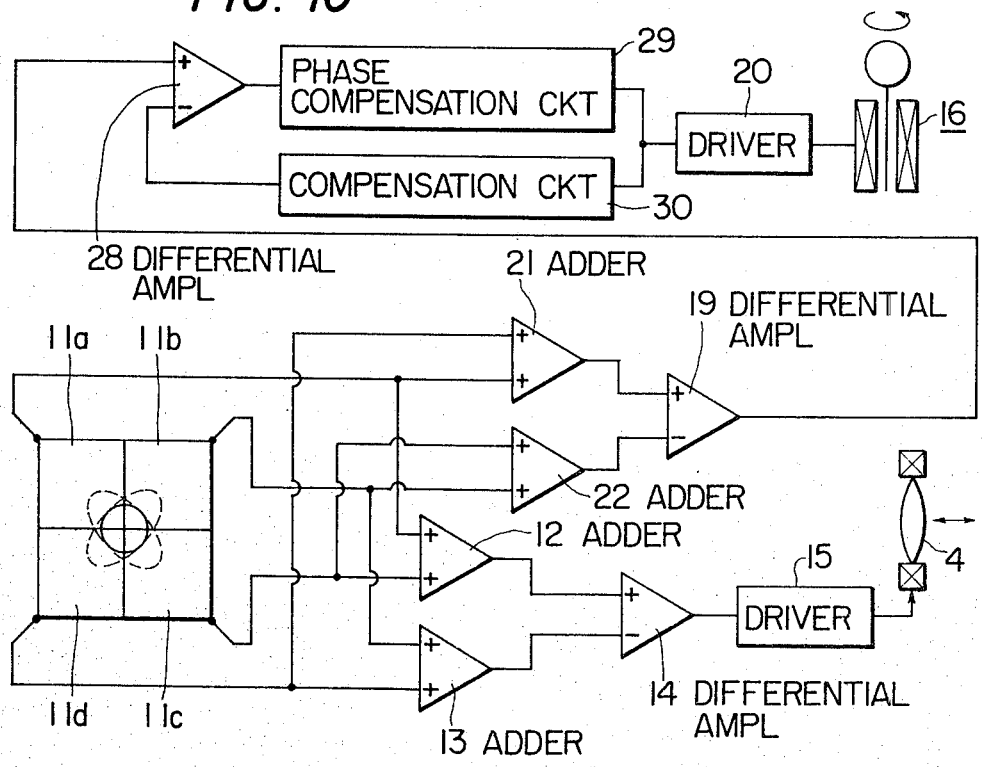
FIG. 10 is a block diagram of another embodiment of this invention.

FIG. 10 is a diagram which shows the construction of an embodiment of this invention for eliminating the above eccentricity of the disk on the tracking. In the figure, the arrangements of the cylindrical lens and the photodetector are the same as in FIGS. 5, 7 and 9, and hence, no repetitive explanation will be made. Referring to FIG. 10, the tracking signal from the differential amplifier 19 moves the optical scanner 16 through a differential amplifier 28, a phase compensation circuit 29 and the driver 20. Here, in case where the amount of eccentricity of the disk is large, there arises a tracking error due to the fact that, as illustrated by way of example in FIG. 11, the beam spot 17 moves from the position of a circle of a dotted line to the position of a circle of a solid line on the photocells 11a–11d. In this respect, in the present embodiment, the error attributed to the movement of the beam spot can be detected in a way stated below. The signal of the optical scanner driver 20 is let to pass through a compensation circuit 30 which has the same frequency characteristic as that of the optical scanner 16 and which has a coefficient to be determined from the intensity of the beam spot and the gain of the adders 21, 22 as well as the differential amplifier 19. Thus, the error attributed to the movement of the beam spot can be evaluated. Accordingly, when the signal of the compensation circuit 30 is applied onto the minus terminal side of the dfferential amplifier 28, the output signal of the differential amplifier 28 includes only the signal due to the contour 18 of the beam diffracted by the track 6.

The phase compensation circuit 29 is constructed of a known phase advance circuit in order to stabilize the tracking servo system. The compensation circuit 30 is constructed of a known feedback compensation circuit in order to eliminate the light component of order zero and to obtain only the diffracted light component as described above. The techniques of phase compensation and feedback compensation are well known, and no detailed description will be made here.

By providing the means as stated above, accordingly, only the diffracted beam contour of the beam spot can be detected, and a good tracking becomes possible even when the amount of eccentricity of the disk is large.

Since the error signal due to the motion of the beam spot depends greatly on the characteristic of the optical scanner, the compensation circuit 30 of such characteristic that the gains at various frequencies are proportional to those of the optical scanner 16 is employed, and moreover, the gain of the compensation circuit 30 is adjusted, whereby the error can be compensated for.

Although, in the foregoing embodiments, the four photocells are employed, it is needless to say that five or more photocells can also be used by contriving the arrayal thereof and the way of deriving outputs.

As set forth above, the information play-back apparatus of this invention is very simple in construction, and it is high in the tracking precision for an information track and is greatly stable. In this way, the invention can sharply reduce the cost of information play-back apparatus, particularly optical video disk play-back apparatus.

We claim:

1. An information play-back apparatus comprising a laser source, a recording medium on which information is recorded in the form of a track, first optical means for projecting a laser beam from said laser source onto the information track on said recording medium, detection means for detecting a reflected laser beam from the information track as an electric signal, second optical means for guiding the reflected laser beam to said detection means through an optical element having a unidirectional lens action, and control means for processing outputs of said first detection means to control the operation of said first optical means, said information play-back apparatus characterized in that said optical element is arranged with its optical axis defining an angle of about 45 degrees with respect to a direction of the information track, and that said detection means has at least four light receiving portions divided symmetrically about two axes such that at least one light receiving portion is in each of the four quadrants formed by the two axes, wherein one of the axes for the division is arranged in parallel with the direction of the information track.

2. Information play-back apparatus according to claim 1, characterized in that said control means comprises a first means for evaluating a first sum between outputs from one set of the light receiving portions situated in two adjacent quadrants on both sides of the axis which is parallel to the direction of the information track and a second means for evaluating a second sum between outputs from the another set of light receiving portions in the remaining two quadrants which are also adjacent and on both sides of the parallel axis and third means for evaluating a difference between the signals of the first and second sums, and that said first optical means has fourth means operative to cause the laser beam to track the information track, the operation of said fourth means being controlled by the output of said third means.

3. Information play-back apparatus according to claim 1, characterized in that said control means comprises a first means for evaluating a first sum between outputs from one set of the light receiving portions situated in two adjacent quadrants on one side of the axis which is parallel to the direction of the information track and a second means for evaluating a second sum between outputs from the another set of light receiving portions in the remaining two quadrants which are also adjacent and on the other side of the parallel axis, and third means for evaluating a difference between the signals of the first and second sums, and that said first optical means has fourth means operative to cause the laser beam to track the information track, the operation of said fourth means being controlled by the output of said third means.

4. Information play-back apparatus according to claim 3, characterized in that the output of said third means is applied to said fourth means through fifth means for compensating for an amount of eccentricity of said recording medium.

5. Information play-back apparatus according to claim 3, characterized in that the output of said third means is applied to said fourth means through fifth means for compensating for an amount of eccentricity of said recording medium.

6. Information play-back apparatus according to claim 1, characterized in that said control means comprises a first means for evaluating a first sum signal between output signals from one set divided light receiving portions in two opposing quadrants formed by the two axes and a second sum signal between output signals from another set of light receiving portions from the remaining two opposing quadrants formed by the two axes, and second means for evaluating a difference between the first and second sum signals obtained from said first means, and that said first optical means has third means operative to adjust a focus of the laser beam on said recording medium, the operation of said third means being controlled by the output of said second means.

7. An information play-back apparatus according to claim 6, characterized in that said control means comprises a fourth means for evaluating a third sum between outputs from one set of the light receiving portions situated in two adjacent quadrants on both sides of the axis which is parallel to the direction of the information track and a fifth means for evaluating a fourth sum between outputs from the another set of light receiving portions in the remaining two quadrants which are also adjacent and on both sides of the parallel axis, and sixth means for evaluating a difference between the signals of the third and fourth sums, and that said first optical means has seventh means operative to cause the laser beam to track the information track, the operation of said seventh means being controlled by the output of said sixth means.

8. Information play-back apparatus according to claim 6, characterized in that said control means further comprises a fourth means for evaluating a third sum between outputs from one set of the light receiving portions situated in two adjacent quadrants on one side of the axis which is parallel to the direction of the information track and a fifth means for evaluating a fourth sum between outputs from another set of light receiving portions in the remaining two quadrants which are also adjacent and on the other side of the parallel axis, and sixth means for evaluating a difference between the signals of the third and fourth sums, and that said first optical means has seventh means operative to cause the laser beam to track the information track, the operation of said seventh means being controlled by the output of said sixth means.

9. Information play-back apparatus according to claim 8, characterized in that the output of said sixth means is applied to said seventh means through eight means for compensating for an amount of eccentricity of said recording medium.

10. Information play-back apparatus according to claim 8, characterized in that the output of said sixth means is applied to said seventh means through eighth means for compensating for an amount of eccentricity of said recording medium.

11. Apparatus for reading a radiation-reflecting record carrier on which information is stored in an optically readable information structure arranged in tracks, comprising radiation source means for providing a read beam of radiation, radiation-sensitive detection system means for converting modulated radiation reflected from said record carrier into an electrical signal, an objective system means for focussing the read beam on an area of the record carrier and for passing the read beam reflected from the record carrier to said radiation-sensitive detection system means, said tracks being oriented in a particular direction in the area of the record carrier on which the read beam is focussed, astigmatic element means in the path of the radiation reflected from the record carrier for imparting astigmatism to said reflected radiation beam, and an array of four sub-detectors disposed in four different quadrants of an imaginary X-Y coordinate system, the X and Y axes being disposed at an angle of 45° with astigmatic focal lines of the astigmatic element means, one of the axes of the coordinate system in whose quadrants the sub-detectors are disposed being parallel to the effective track direction, the astigmatic focal lines being disposed at an angle of 45° to the effective track direction.

* * * * *